(12) United States Patent
Burer

(10) Patent No.: US 6,550,740 B1
(45) Date of Patent: Apr. 22, 2003

(54) SHOCK ABSORBING PLATFORM

(76) Inventor: Peter J. Burer, 10720 72$^{nd}$ St., Suite 304, Largo, FL (US) 33777

( * ) Notice: Subject to any disclaimer, the term of this patent is extended or adjusted under 35 U.S.C. 154(b) by 0 days.

(21) Appl. No.: 09/683,708

(22) Filed: Feb. 5, 2002

(51) Int. Cl.$^7$ ................................................ F16M 13/00
(52) U.S. Cl. ...................... 248/564; 248/370; 248/588; 297/338
(58) Field of Search ................................. 248/564, 588, 248/370; 108/147; 297/311, 337, 338, 339

(56) References Cited

U.S. PATENT DOCUMENTS

| | | | |
|---|---|---|---|
| 2,829,863 A | * 4/1958 | Gibson | 108/117 |
| 3,086,742 A | 4/1963 | Severson | |
| 3,109,621 A | 11/1963 | Simons et al. | |
| 3,110,476 A | * 11/1963 | Farris | 108/119 |
| 3,716,213 A | * 2/1973 | Lacey | 248/564 |
| 3,752,432 A | * 8/1973 | Lowe | 248/564 |
| 4,074,886 A | 2/1978 | Yates | |
| 4,093,197 A | 6/1978 | Carter et al. | |
| 4,125,242 A | 11/1978 | Meiller et al. | |
| 4,151,973 A | * 5/1979 | Sedlock | 248/421 |
| 4,382,573 A | 5/1983 | Aondetto | |
| 4,448,386 A | * 5/1984 | Moorhouse et al. | 248/564 |
| 4,558,648 A | * 12/1985 | Franklin et al. | 108/136 |
| 4,577,821 A | * 3/1986 | Edmo et al. | 108/145 |
| 4,640,488 A | 2/1987 | Sakamoto | |
| 4,645,169 A | 2/1987 | Mischer | |
| 4,822,094 A | 4/1989 | Oldfather et al. | |
| 4,890,810 A | 1/1990 | Sakamoto | |
| 5,011,109 A | 4/1991 | Nagata | |
| 5,169,112 A | 12/1992 | Boyles et al. | |
| 5,176,355 A | * 1/1993 | Carter | 248/550 |
| 5,285,992 A | * 2/1994 | Brown | 108/147 |
| 5,400,720 A | * 3/1995 | Stevens | 108/147 |
| 5,580,027 A | 12/1996 | Brodersen | |
| 5,735,509 A | 4/1998 | Gryp et al. | |
| 5,799,922 A | 9/1998 | Timms et al. | |
| 5,927,679 A | 7/1999 | Hill | |
| 5,950,977 A | 9/1999 | Proksch et al. | |
| 6,120,082 A | 9/2000 | Vandermolen | |
| 6,135,412 A | 10/2000 | Buehler | |
| 6,170,914 B1 | * 1/2001 | Chang | 297/339 |
| 6,186,467 B1 | 2/2001 | Wahls | |
| 6,202,972 B1 | 3/2001 | Manavi | |
| 6,264,163 B1 | 7/2001 | Ivarsson | |

* cited by examiner

*Primary Examiner*—Korie Chan
(74) *Attorney, Agent, or Firm*—Ronald E. Smith; Smith & Hopen, P.A.

(57) ABSTRACT

A shock absorbing platform includes a bottom plate and a top plate joined to one another at their respective rearward and side peripheral edges by elongate rigid links that enable the plates to remain in parallel relation to one another as the top plate moves in relation to the bottom plate. In a first embodiment, an opening formed in the bottom plate accommodates the upper end of a platform-supporting pedestal so that the platform may be retrofit onto a pre-existing pedestal. The forward edge of the platform is open so that height-adjusting and seat-rotating pins are readily accessible. A cylinder is pivotally mounted on each outboard side of the platform and its plunger bears against a roller of a truncate link assembly that interconnects the top and bottom plates at their respective forward edges. Downward forces applied to the top plate are resisted by the cylinders.

9 Claims, 4 Drawing Sheets

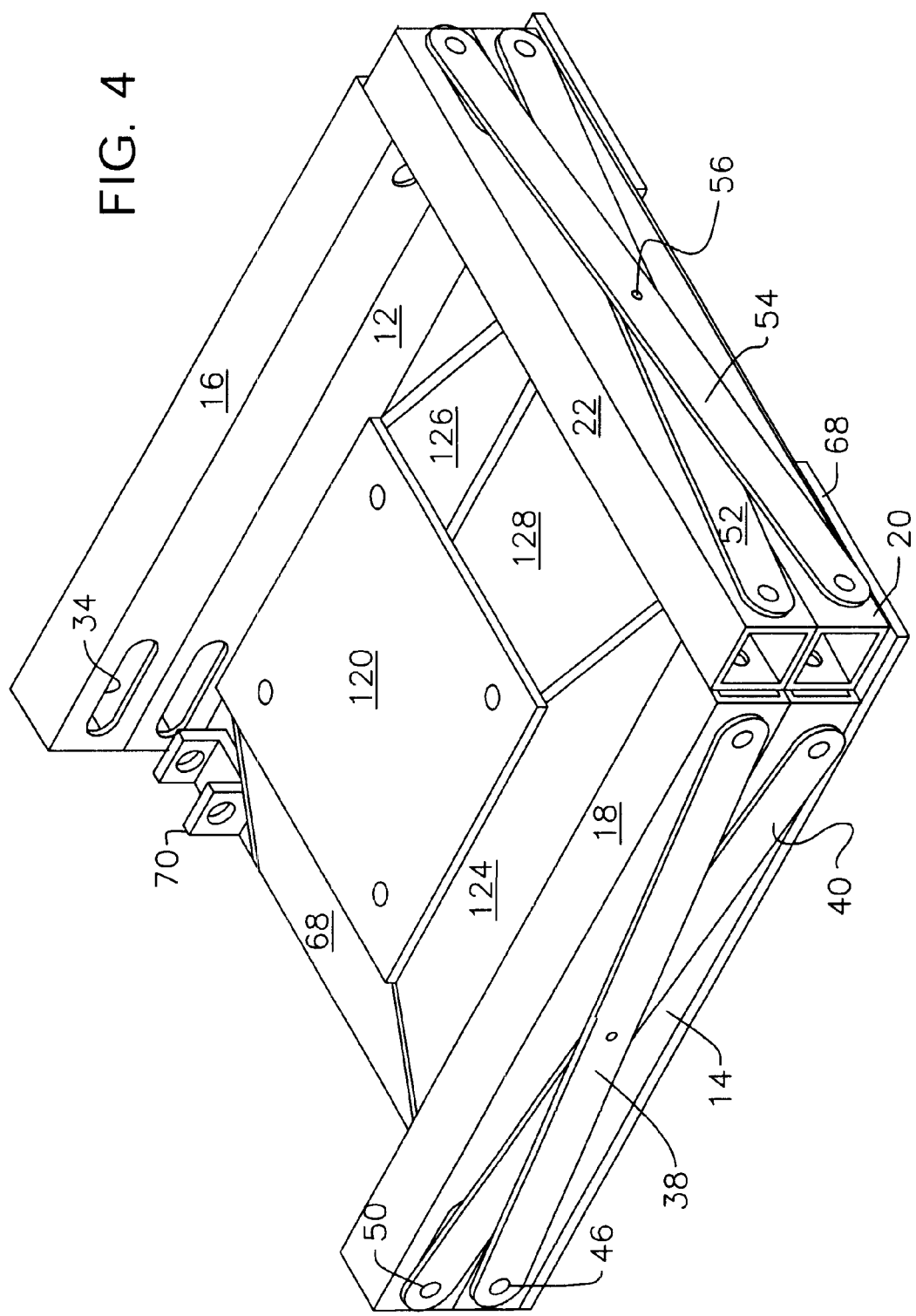

SHOCK ABSORBING PLATFORM

BACKGROUND OF INVENTION

1. Field of the Invention

This invention relates, generally, to a platform construction. More particularly, it relates to a platform having utility as a seat or as a platform upon which to stand in vehicles subjected to violent shocks such as speedboats, aircraft and the like.

2. Description of the Prior Art

Shock absorbing marine platforms are typically mounted atop an upstanding pedestal that is supported by the deck of a boat. Many boats are equipped with poorly designed platforms that provide inadequate protection against shocks of the type encountered by a high speed watercraft. Moreover, many of the known platforms are structurally complex mechanisms requiring specially manufactured, expensive parts.

What is needed, then, is a shock absorbing platform having improved shock absorbing attributes. The needed shock absorbing platform should be made of inexpensive, commonly available parts as well.

Speedboats are often equipped with a pedestal-mounted bolster chair having a heavily padded back and sides and a seat that may be folded out of the way when a user desires to stand. The user folds the horizontal seat when it is unable to adequately attenuate shocks generated by the violent jolting of the vehicle and stands in a space bounded by the back and sides. However, the standing user must then rely on his or her legs to absorb the shocks as they come.

There exists a need, therefore, for a shock-absorbing platform upon which a user may stand when a vehicle is undergoing intense vibrations and shocks.

Moreover, there is a need for such a platform that fits within the space bordered by the back and sides of a bolster chair so that a standing user could be protected at the back and sides by the bolster chair while standing on a shock absorbing platform.

Some boats, such as bass boats, lack pedestals and shock absorbing seats. There is a need, then, for a shock absorbing seat that can be placed in a boat having no pedestal.

Many boat owners would like to replace their platforms, but no platforms are available that could be retrofit onto an existing pedestal.

There exists a further need, therefore, for an improved shock absorbing platform that can be easily retrofit onto existing pedestals.

U.S. Pat. No. 3,109,621 to Etal discloses a shock absorbing seat of the type not designed to be retrofit onto an existing pedestal. It includes a shock absorbing cylinder in the center of the bottom of the seat. As such, the seat cannot be mounted atop a pre-existing pedestal. The same observation holds for the platforms disclosed in U.S. Pat. No. 4,093,197 to Carter, U.S. Pat. No. 4,125,242 to Meiller et al., U.S. Pat. No. 4,382,573 to Aondetta, and many other similar patents.

Moreover, the shock absorbing attributes of the platforms of the prior art are difficult to adjust. For example, the shock absorbing platform disclosed in U.S. Pat. No. 3,086,742 to Severson requires disassembly and re-assembly of the apparatus to replace a first set of spacer members with a second set of spacer members when a primary adjustment means is inadequate.

Many other patents disclose platforms that might be mountable atop a pedestal, but if so mounted would be nonadjustable in height or in rotational adjustment. For example, U.S. Pat. No. 4,640,488 to Sakamoto discloses a platform structure where a transversely disposed frame member at the front of the assembly would bar access to a height adjustment pin or a rotational adjustment pin if the platform were mounted atop a pedestal.

There therefore exists a need for platform that can be retrofit onto a pre-existing pedestal and that includes readily accessible height and rotational adjustment means.

However, in view of the prior art considered as a whole at the time the present invention was made, it was not obvious to those of ordinary skill in the pertinent art how the identified needs could be fulfilled.

SUMMARY OF INVENTION

The long-standing but heretofore unfulfilled needs for a platform that is retrofittable onto a pre-existing upstanding pedestal, which provides easy access to adjustment means, and which may be used without a pedestal as a platform upon which to stand or as a platform upon which to sit, is now met by a new, useful, and nonobvious invention.

The novel platform includes a bottom plate having a central opening formed therein. The central opening, in a first embodiment, is adapted to receive an uppermost end of a pre-existing upstanding pedestal.

A flat plate is disposed in elevated relation to the bottom plate and in alignment with said central opening to provide a mounting surface for a pedestal that extends through said central opening. The flat plate is secured to an uppermost end of the pre-existing upstanding pedestal in surmounting relation thereto.

A top plate is disposed in parallel relation to the bottom plate and in vertically spaced apart, parallel relation to the flat plate.

A plurality of pairs of rigid link members are positioned at the side and rearward edges of the top plate and the bottom plate in interconnecting relation thereto. Each pair of rigid link members is interconnected to one another in a scissors-like interconnection so that the top plate and bottom plate remain in parallel relation to one another when the top plate is displaced relative to the bottom plate.

A height-adjustment pin has a handle and a pedestal-engaging distal end so that the height of the platform is adjustable along the extent of the pedestal when the pin is pulled and so that the height of the platform is locked when the pin is released. The height-adjustment pin is accessible from the front of the platform due to the of the flat plate relative to the bottom plate.

The flat plate is supported at its opposite edges thereof by upstanding side walls mounted to the bottom plate on opposite sides of the central opening.

A first and second pair of truncate links interconnect respective front edges of the top plate and bottom plate at laterally spaced apart opposite sides thereof. A first link of the first pair of links has a leading end pivotally secured to a front edge of the top plate and a trailing end pivotally secured to a first axle means to which is pivotally secured the trailing end of a second link of the first pair of truncate links. The second link of the first pair has a leading end pivotally secured to a front edge of the bottom plate. A first link of the second pair of links has a leading end pivotally secured to a front edge of the top plate and a trailing end pivotally secured to a second axle means to which is pivotally secured the trailing end of a second link of the second pair of truncate links. The second link of the second pair has a leading end pivotally secured to a front edge of the bottom plate.

First and second cylinders, also known as gas springs, are disposed in laterally spaced relation to one another between the top plate and the bottom plate on opposite sides of the central opening. Each of the first and second cylinders has a first end pivotally secured to the bottom plate near the rearward edge thereof. The first and second cylinders have first and second plungers, respectively, adapted to engage the first and second pairs of truncate links.

More particularly, a first roller is mounted on the first axle means disposed between the respective trailing ends of the first pair of truncate links. The first plunger bears against the first roller to urge an angle between the first pair of truncate links to increase, thereby causing an increase in distance between the top and bottom plates.

A second roller is mounted on the second axle means disposed between the respective trailing ends of the second pair of truncate links. The second plunger bears against the second roller to urge an angle between the second pair of truncate links to increase, thereby causing an increase in distance between the top and bottom plates.

An elongate first bias means encircles the first cylinder and plunger, i.e., the first gas spring, and urges the first plunger to extend outwardly from its cylinder to bear against the first roller. An elongate second bias means encircles the second cylinder and plunger, i.e., the second gas spring, and urges the second plunger to extend outwardly from its cylinder to bear against the second roller. The first and second bias means are preferably provided in the form of coil springs. Suitable means are provided for adjusting the force exerted by each spring.

The first and second gas springs cooperatively resist external forces applied to the top plate that urge the distance between the top and bottom plates to decrease.

In a second embodiment, the novel platform includes a bottom plate and a top plate disposed in parallel, vertically spaced apart relation to the bottom plate. A plurality of pairs of rigid link members are positioned at the side and rearward edges of the top plate and the bottom plate in interconnecting relation thereto. Each pair of rigid link members is interconnected to one another in scissors interconnection so that the top plate and bottom plate remain in parallel relation to one another when the top plate is displaced relative to the bottom plate. A pair of gas springs is disposed between the top plate and the bottom plate in interconnecting relation thereto. There is no center opening formed in the bottom plate to accommodate a pedestal. Forces imparted to the top plate are resisted by the gas springs. The platform has utility as a shock absorbing platform when stood upon as a seat means when sat upon.

An important object of this invention is to provide a shock absorbing platform is easily retrofit onto a pre-existing pedestal for the purpose of replacing an inadequate platform.

Another important object is to provide a platform that has height adjustment and rotational adjustment means that are readily accessible to users.

It is also an important object to provide a platform made of readily available, inexpensive parts.

Another object is to provide a platform that may be directly supported by a boat deck or other vehicle surface, in the absence of pedestals, so that it may be stood upon.

A closely related object is to provide such a platform that is sized to fit within the confines of a bolster chair so that a user can simultaneously gain the benefits of a bolster chair and the shock absorbing platform when the seat part of the bolster chair is folded into a storage position.

Still another object is to provide a platform upon which a user can sit upon in a boat or other vehicle lacking a shock absorbing seat.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 4 is a second rear perspective view thereof.

DETAILED DESCRIPTION

Figure 1:
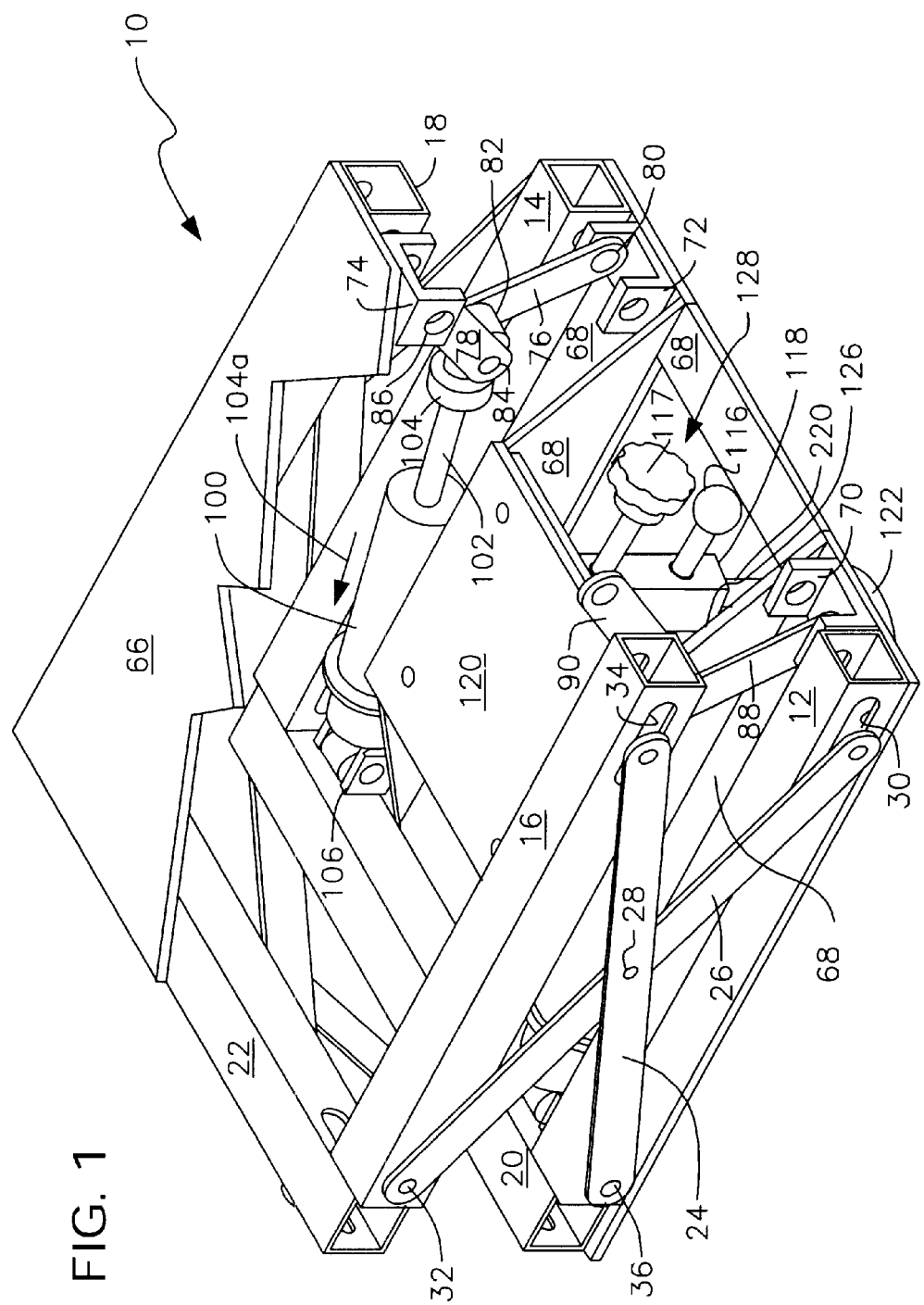
FIG. 1 is a first front perspective view of the novel shock absorbing platform.

Referring to FIG. 1, it will there be seen that the reference numeral 10 denotes an illustrative embodiment of the novel shock absorbing marine platform as a whole.

Platform 10 includes six (6) hollow girders or beams with a square or rectangular cross section, known in the mechanical arts as box girders or box beams. In the first front perspective view of FIG. 1, the box beams are identified as left lower box beam 12, right lower box beam 14, left upper box beam 16, right upper box beam 18, rear lower box beam 20, and rear upper box beam 22. Box beams 12, 14, 16, and 18 are longitudinally disposed and box beams 20, 22 are transversely disposed.

Box beams 12 and 16 are parallel to one another and are interconnected to one another by elongate rigid links 24, 26 that are pivotally connected to one another at their respective centers by pivot pin 28. The forward end of link 26 is pivotally and slideably connected to box beam 12 at slot 30 and the rearward end of said link is pivotally connected to box beam 16 at pivot point 32. The forward end of link 28 is pivotally and slideably connected to box beam 16 at slot 34 and the rearward end of said link is pivotally connected to box beam 12 at pivot point 36.

Figure 2:
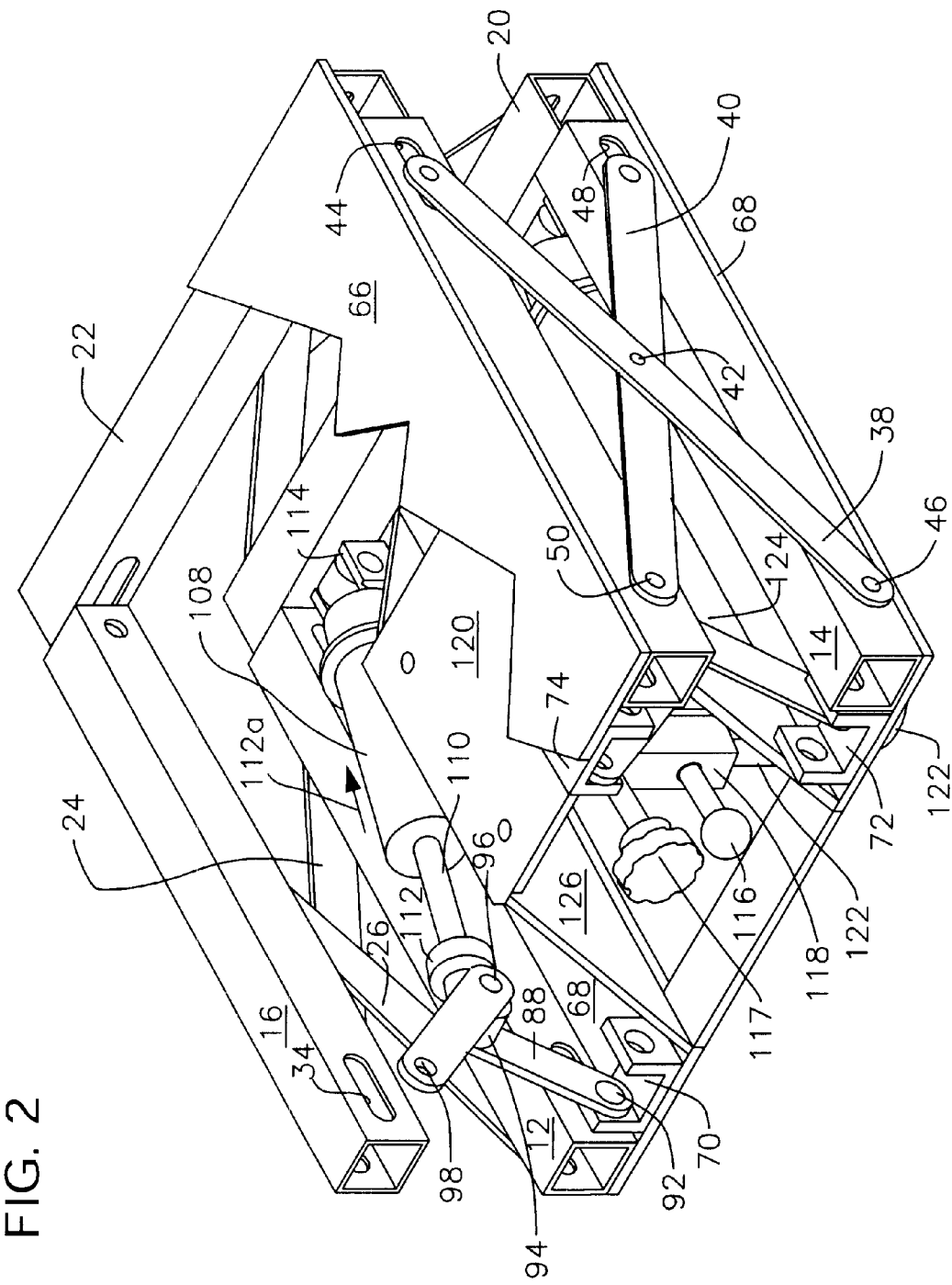
FIG. 2 is a second front perspective view thereof.

As best understood in connection with FIG. 2, box beams 14 and 18 are parallel to one another and are interconnected to one another by elongate rigid links 38, 40 that are pivotally connected to one another at their respective centers by pivot pin 42. The rearward end of link 38 is pivotally and slideably connected to box beam 18 at slot 44 and the forward end of said link is pivotally connected to box beam 14 at pivot point 46. The rearward end of link 40 is pivotally and slideably connected to box beam 14 at slot 48 and the forward end of said link is pivotally connected to box beam 18 at pivot point 50.

Figure 3:
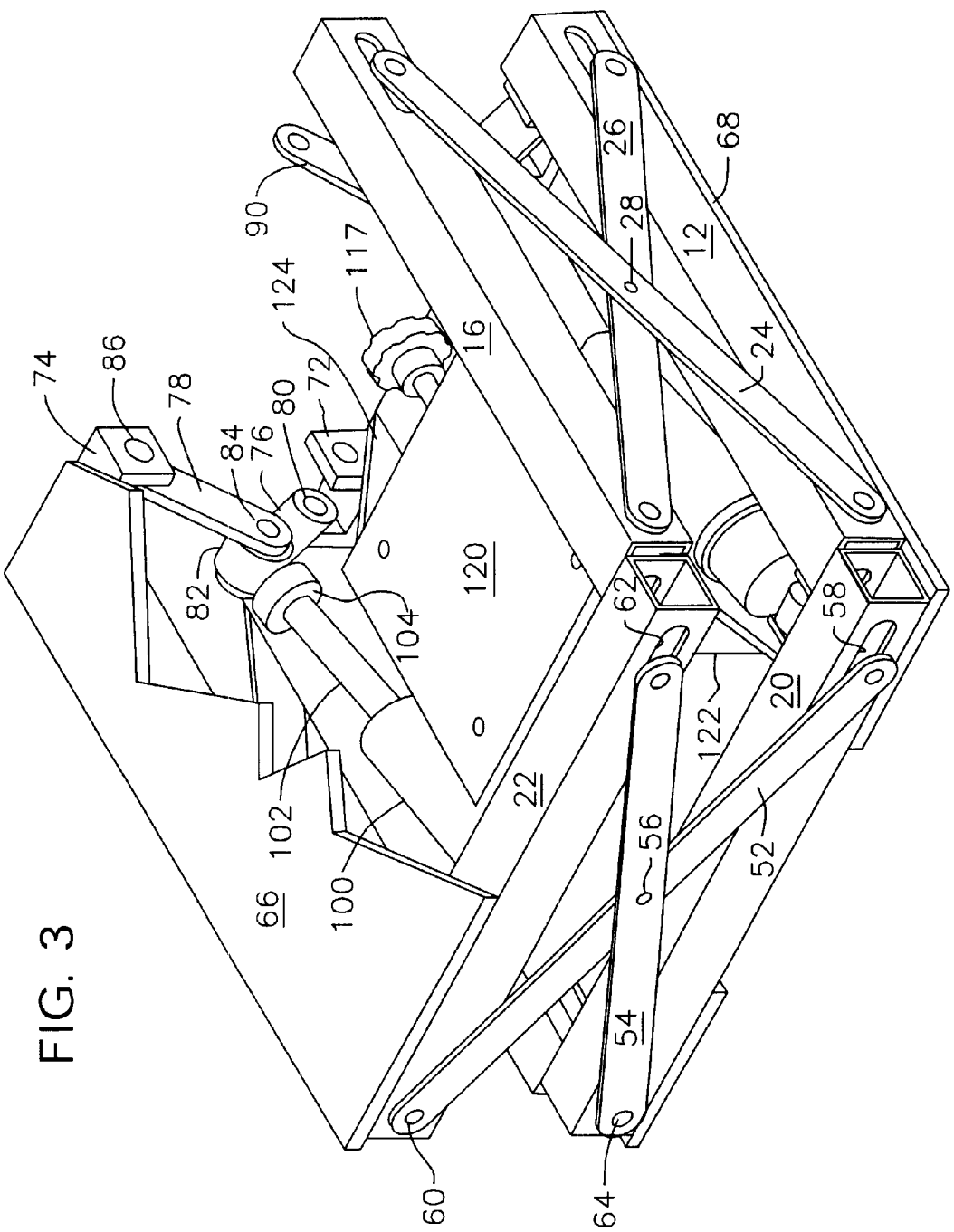
FIG. 3 is a first rear perspective view thereof.

As best understood in connection with the rear perspective view of FIG. 3, box beams 20 and 22 are parallel to one another and are interconnected to one another by elongate rigid links 52, 54 that are pivotally connected to one another at their respective centers by pivot pin 56. A first end of link 52 is pivotally and slideably connected to box beam 20 at slot 58 and a second end of said link is pivotally connected to box beam 22 at pivot point 60. A first end of link 54 is pivotally and slideably connected to box beam 22 at slot 62 and a second end of said link is pivotally connected to box beam 20 at pivot point 64.

The scissors-like linkages on the side and rearward peripheral edges of novel platform 10 thus maintain upper box beams 16, 18, and 22 in parallel relation to lower box beams 12, 14, and 20 throughout an entire range of motion by said upper box beams relative to said lower box beams. The mounting of said scissors-like links on said periphery provides an open center area for platform 10 so that said platform can be retrofit onto a pre-existing pedestal.

Flat top plate 66 overlies upper box beams 16, 18, and 22 and is secured thereto by any suitable means; it is cut away in the Figures just to better reveal the parts otherwise hidden by said flat plate. A seat cushion, or other suitable seating fixture, not shown, overlies flat plate 66 and is secured thereto by suitable means.

Flat bottom plate 68 underlies bottom box beams 12, 14, 20 and supports them in coplanar relation to one another. Channel member 70 is positioned laterally adjacent to box beam 12, inboard thereof, and is secured to the forward edge of bottom plate 68 in flush relationship therewith. Similarly, channel member 72 is positioned laterally adjacent box beam 14, inboard thereof, and is secured to the forward edge of said bottom plate 68 in flush relationship therewith.

Channel member 74 is positioned laterally adjacent to box beam 18, inboard thereof, and is secured to the forward edge of top plate 66 in flush relationship therewith. Similarly, an unillustrated channel member having the same construction as channel member 74 is positioned laterally adjacent box beam 16, inboard thereof, is secured to the forward edge of said upper plate 66 in flush relationship therewith.

A first pair of truncate rigid link members 76 and 78 interconnect channel members 72 and 74 and hence said link members interconnect top plate 66 and bottom plate 68 at their respective forward edges. More particularly, a first or leading end of truncate link 76 is pivotally connected to an outboard end of channel member 72 as at 80 and a second or trailing end of said truncate link is pivotally connected to an outboard end of roller 82. A leading end of truncate link 78 is pivotally connected as at 86 to an inboard end of channel member 74 and a trailing end of truncate link 78 is pivotally connected as at 84 to an inboard end of said roller 82.

In the same way, as best understood in connection with FIG. 2, a second pair of truncate rigid link members 88 and 90 interconnect channel member 70 and its unillustrated counterpart positioned directly above it, and said link members therefore further interconnect top plate 66 and bottom plate 68 at their respective forward edges. More particularly, a first end of truncate link 88 is pivotally connected to an outboard end of channel member 70 as at 92 and a second end of said truncate link is pivotally connected to an outboard end of roller 94. A leading end of truncate link 90 is pivotally connected as at 98 to an inboard end of the unillustrated channel member and a trailing end of truncate link 90 is pivotally connected as at 96 to an inboard end of said roller 94.

Significantly, the first and second pair of truncate links are laterally spaced apart from one another on opposite sides of platform 10, in spaced relation to the center of platform 10 so that a clear central area is maintained for retrofitting platform 10 to a pre-existing pedestal.

As best depicted in FIG. 1, first shock absorber damper means or gas spring 100 has plunger 102 that terminates in head 104 that abuts roller 82. The rearward end of shock absorber 100 is pivotally mounted to channel member 106, said channel member being secured to bottom plate 68.

As best depicted in FIG. 2, second shock absorber damper means or gas spring 108 has plunger 110 that terminates in head 112 that abuts roller 94. The rearward end of shock absorber 108 is pivotally mounted to channel member 114, said channel member 114 being secured to bottom plate 68.

First and second shock absorbers 100 and 108 are laterally spaced apart from one another on opposite sides of platform 10, in spaced relation to the center of platform 10 so that a clear central area is maintained for retrofitting platform 10 to a pre-existing pedestal.

Plunger heads 104, 112 are biased to press against rollers 82, 94, respectively, urging the angle between links 76 and 78 and between links 88 and 90, respectively, to increase. The distance between top plate 66 and bottom plate 68 increases as said respective angles increase. The weight of a seated user, not shown, urges said respective angles to decrease, thereby urging plates 66 and 68 to move closer together. As each motion-induced shock is transmitted to the user and hence to the unillustrated seat cushion and hence to top plate 66, such shock is therefore resisted by cylinder 100 and plunger 104 and simultaneously by cylinder 108 and plunger.

More particularly, as plunger heads 104 and 112 are simultaneously displaced in the direction indicated by directional arrows 104a, 112a, respectively, top plate 66 and bottom plate 68 converge toward one another against the bias of their respective cylinders. FIG. 4 depicts the fully converged position where lower box beams 12, 14, 20 abut upper box beams 16, 18, 22. This represents a shipping configuration of novel platform 10, with cylinders 100, 108 removed; the upper and lower box beams do not abut one another when platform 10 is fully assembled and shocks of the type normally encountered are insufficient to cause contact between said box beams. However, in the event an extraordinary shock overcomes the resistance of the gas springs, several hard plastic buttons, not shown, are secured to the upper surface of lower box beams 12, 14, and 20 to provide extra absorbing capability and to protect the structural integrity of the upper and lower box beams.

When plunger heads 104, 112 are extended in a direction opposite to said directional arrows 104a, 112a, said plunger heads bear against rollers 82, 94, respectively, and cause the first and second pairs of truncate links to unfold, thereby driving top plate 66 and bottom plate 68 further apart. Shock absorbers 100, 108, resist all forces that tend to cause said truncate links to form a more acute angle with one another, i.e., all downwardly-directed forces applied normal to top plate 66 that urge plunger heads 104, 112 towards their respective cylinders.

The height of platform 10 relative to a support surface such as a boat deck is adjusted by manipulation of height adjustment pin 116. The distal free end of said pin 116 is slidingly received by an aperture formed within locking box 118, said locking box being secured to an underside of flat plate 120 that surmounts pedestal 122. Locking box 118 is in operable sliding engagement with pedestal 122. Locking box 118 is movable up or down along the extent of pedestal 122 when locking pin 116 is pulled radially outwardly with respect to pedestal 122, and a selected vertical adjustment is locked into place upon release of locking pin 116, said pin being biased to travel radially inwardly to engage a bore formed for that purpose in said pedestal. Rotation adjustment pin 117 works in a similar way to lock platform 10 in any preselected angular adjustment about a vertical axis of pedestal 122.

Flat plate 120 surmounts pedestal 122 as aforesaid and is secured thereto for concomitant movement therewith. Upstanding trapezoidal walls 124, 126 support flat plate 120 at its laterally opposed ends, said walls 124, 126 being mounted atop bottom plate 68. Central opening 128 is formed in bottom plate 68 to accommodate pedestal 122, locking box 118, and adjustment pins 116, 117. Central opening 128 and flat plate 120 enable novel platform 10 to be retrofit onto any pre-existing pedestal.

Significantly, height adjustment pin 116 and rotation adjustment pin 117 are both accessible from the front of platform 10, there being no obstructions to such access. This important feature is provided by placing the links and shock absorbers on or near the outer periphery of platform 10 as mentioned earlier, and by elevating flat plate 120 with respect to bottom plate 68. As clearly depicted in FIGS. 1 and 2, a user has ample access to pins 116, 117, there being no parts of the novel platform that extend across the front thereof. In this way, the important objects of providing a shock absorbing marine platform that is easily retrofit onto a pre-existing pedestal and which facilitates adjustment of the platform are met in an elegant, structurally sound manner. Moreover, the peripheral mounting of the scissor-like links, the truncate links, and the shock absorbing cylinders which make possible the retrofitting of the pedestal also provide superior shock absorbing characteristics. The novel platform is made from easily available, inexpensive parts as well.

The novel platform also has utility on boats, aircraft, and other vehicles subjected to shocks that do not include pedestals, i.e., it may be used with no connection to a pedestal.

For example, platform 10 may simply be placed upon the deck of a boat and upon to relieve the user from shocks transmitted to the deck of the boat.

If the boat is equipped with a bolster chair, platform 10 may be positioned within the area bordered by the back and sides of the bolster chair.

If a bolster chair is too narrow to accept platform 10 within said bordered area, a second embodiment of this invention provides a platform 10 having a narrower configuration than platform 10 of the first embodiment. In the narrower configuration, there is no need for central aperture 128 in bottom plate 68 and no need for flat plate 120 because platform 10 is not pedestal-mounted in said second embodiment. Accordingly, central aperture 128 is eliminated or made more narrow, flat plate 120 is eliminated or made more narrow, and top and bottom plates 66, 68, respectively, are made more narrow as well. In this way, gas springs 100, 108 and all parts related thereto, such as the first and second pairs of truncate links, are positioned closer together. Such second embodiment of platform 10, not shown, is positioned on a deck or other support surface within the bordered area of a bolster chair and stood upon.

In a third embodiment, either the relatively wider first embodiment of the relatively narrower second embodiment is placed in a boat such as a bass boat and used as a shock absorbing seat. Platform 10 is not pedestal-mounted in such third embodiment and it may be used in either its first or second embodiment form, depending upon the space available in the boat or other vehicle where it is used as a seat.

Platform 10 may be provided in many different unillustrated configurations, all of which are within the scope of this invention. For example, gas springs 100 and 108 are disposed in parallelism with one another in the depicted embodiment, with their respective rearward ends pivotally mounted to channel members 106, 114, respectively, and with their respective plungers disposed in abutting relation to the first and second pairs of truncate link members. The arrangement for one of the gas springs could be reversed, with a preselected pair of the roller and truncate link assemblies being positioned along the rearward edge of platform 10 in interconnecting relation to the top and bottom plates and with the cylinder of the gas spring being pivotally secured to top plate 66.

Moreover, instead of pivotally mounting a preselected end of the gas springs, both ends of both gas springs could be held by a roller and truncate link assembly, thereby eliminating channel members 106, 114. Each roller and truncate link assembly may be thought of as a whole as a shackles or a shackles means. Thus, both gas springs be reversed from their illustrated positions so that both shackles are positioned along the rearward edge of platform 10 and so that the rearward end of each cylinder is pivotally mounted at the forward edge of the platform. Moreover, a third and fourth pair of shackles could be added so that each gas spring is held at its opposite ends by shackles in which case neither end of the gas springs would be pivotally mounted to a channel member such as channel members 106, 114.

These and other re-arrangements of parts are within the scope of this invention.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:
1. A platform that absorbs shocks, comprising:
   a bottom plate having a central opening formed therein, said central opening adapted to receive an uppermost end of an upstanding pedestal;
   a flat plate disposed in elevated relation to said bottom plate, said flat plate adapted to be secured to an uppermost end of said upstanding pedestal in surmounting relation thereto;
   a top plate disposed in parallel relation to said bottom plate;
   a plurality of pairs of rigid link members positioned at the side rearward edges of said top plate and said bottom plate in interconnecting relation thereto;
   each pair of rival link members being interconnected to one another in scissors interconnection so that said top plate and bottom plate remain in said parallel relation to one another when said top plate is displaced relative to said bottom plate
   a pair of shock-absorbing damper means disposed between said top plate and said bottom plate in interconnecting relation thereto; and
   said platform adapted to be retrofit onto said upstanding pedestal by mounting said flat plate to said upstanding pedestal in surmounting relation thereto.

2. The platform of claim 1, wherein said flat plate is supported at opposite edges thereof by upstanding side walls mounted to said bottom plate on opposite sides of said central opening.

3. The platform of claim 1, further comprising a first and second pair of truncate links that interconnect respective front edges of said top plate and bottom plate at laterally spaced apart opposite sides thereof.

4. The platform of claim 3, further comprising a first link of said first pair of truncate links having a leading end pivotally secured to a front edge of said top plate and a trailing end pivotally secured to a trailing end of a second link of said first pair, said second link of said first pair having a leading end pivotally secured to a front edge of said bottom plate.

5. The platform of claim 4, further comprising a first link of said second pair of truncate links having a leading end pivotally secured to a front edge of said top plate and a trailing end pivotally secured to a trailing end of a second link of said second pair, said second link of said second pair having a leading end pivotally secured to a front edge of said bottom plate.

6. The platform of claim 5, further comprising:

first and second cylinders disposed in laterally spaced relation to one another between said top plate and said bottom plate;

each of said first and second cylinders having a first end pivotally secured to said bottom plate; and a said first and second cylinders having first and second plungers, respectively, adapted to engage said first and second pairs of truncate links.

7. The platform of claim 6, further comprising:

a first roller mounted between the respective trailing ends of said first pair of truncate links, said first plunger bearing against said first roller to urge an angle between said first pair of truncate links to increase, thereby causing an increase in distance between said top and bottom plates;

said first cylinder resisting external forces applied to said top plate that urge the distance between said top and bottom plates to decrease;

a second roller mounted between the respective trailing ends of said second pair of truncate links, said second plunger bearing against said second roller to urge an angle between said second pair of truncate links to increase, thereby causing an increase in distance between said top and bottom plates; and said second cylinder resisting external forces applied to said top plate that urge the distance between said top and bottom plates to decrease.

8. A platform that is height-adjustable, comprising:

a bottom plate having a central opening formed therein, said central opening adapted to receive an uppermost end of an upstanding pedestal;

a top plate disposed in parallel, vertically spaced apart relation to skid bottom plate;

a first pair of rigid link members positioned at a first side edge of said top plate and said bottom plate in interconnecting relation thereto;

a second pair of rigid link members positioned at a second side edge of said top plate and said bottom plate in interconnecting relation thereto;

a third pair of rigid link members positioned at a rearward edge of said top plate and said bottom plate in interconnecting relation thereto, each rigid link member of each pair of said first, second, and third pair of rigid link members being interconnected to one another in scissors interconnection so that said top plate and bottom plate remain in said parallel relation to one another when said top plate is displaced relative to said bottom plate;

a pair of gas springs disposed between said top plate and said bottom plate in interconnecting relation thereto;

whereby forces imparted to said top plate are resisted by said gas strings;

whereby said platform has utility as a height-adjusting platform; and whereby said platform has utility as a seat means when sat upon.

9. The platform of claim 8, further comprising a first and second pair of truncate links that interconnect respective front edges of said top plate and bottom plate at laterally spaced apart opposite sides thereof.

* * * * *